US008972887B2

(12) United States Patent
Kobayashi et al.

(10) Patent No.: US 8,972,887 B2
(45) Date of Patent: Mar. 3, 2015

(54) MOBILE ELECTRONIC DEVICE

(75) Inventors: Hiroki Kobayashi, Daito (JP); Hiroyuki Okamoto, Daito (JP)

(73) Assignee: KYOCERA Corporation, Kyoto (JP)

( * ) Notice: Subject to any disclaimer, the term of this patent is extended or adjusted under 35 U.S.C. 154(b) by 324 days.

(21) Appl. No.: 13/446,616

(22) Filed: Apr. 13, 2012

(65) Prior Publication Data

US 2012/0262495 A1   Oct. 18, 2012

(30) Foreign Application Priority Data

Apr. 15, 2011   (JP) .................. 2011-090621

(51) Int. Cl.
| | | |
|---|---|---|
| G06F 3/048 | (2013.01) |
| G06F 1/16 | (2006.01) |
| G06F 3/0486 | (2013.01) |
| G06F 3/0488 | (2013.01) |
| G06F 3/14 | (2006.01) |
| G09G 3/32 | (2006.01) |
| G09G 3/34 | (2006.01) |

(52) U.S. Cl.
CPC ............ G06F 1/1624 (2013.01); G06F 1/1616 (2013.01); G06F 1/1677 (2013.01); G06F 1/1692 (2013.01); G06F 3/0486 (2013.01); G06F 3/0488 (2013.01); G06F 3/1431 (2013.01); G06F 3/1438 (2013.01); G09G 3/3208 (2013.01); G09G 3/3406 (2013.01)
USPC ............ 715/799; 715/788; 715/761; 345/1.3; 345/1.1

(58) Field of Classification Search
USPC ............ 345/1.1, 1.2, 1.3, 672; 715/733, 761, 715/766, 788, 799, 967; 463/31, 36, 37, 67
See application file for complete search history.

(56) References Cited

U.S. PATENT DOCUMENTS

| | | | |
|---|---|---|---|
| 6,545,669 B1 * | 4/2003 | Kinawi et al. ................. 345/173 |
| 2010/0156887 A1 * | 6/2010 | Lindroos et al. ............. 345/418 |
| 2011/0072394 A1 * | 3/2011 | Victor ........................... 715/821 |
| 2011/0267371 A1 * | 11/2011 | Song et al. .................... 345/660 |

FOREIGN PATENT DOCUMENTS

| | | |
|---|---|---|
| JP | 09-305262 | 11/1997 |
| JP | 2010-092269 | 4/2010 |

OTHER PUBLICATIONS

Non-Final Office Action mailed on Nov. 4, 2014 and issued by the Japanese Patent Office for Japanese Application No. 2011-090621.

* cited by examiner

*Primary Examiner* — Xiao M. Wu
*Assistant Examiner* — Steven Elbinger

(57) ABSTRACT

A device and methods for controlling a display for a mobile terminal device are presented. A first input to a first display module is detected, and a second input to the second display module is detected. The first input is for moving an image displayed on the first display module. The image is moved to a second location of the second input to the second display module, if the second input is detected after the first input when the image is displayed on the first display module.

14 Claims, 8 Drawing Sheets

MOBILE ELECTRONIC DEVICE

CROSS-REFERENCE TO RELATED APPLICATION

The present application claims priority under 35 U.S.C. §119 to Japanese Patent Application No. 2011-090621, filed on Apr. 15, 2011, entitled "ELECTRONIC MOBILE TERMINAL DEVICE". The content of which is incorporated by reference herein in its entirety.

FIELD

Embodiments of the present disclosure relate generally to mobile electronic devices, and more particularly relate to a mobile electronic device with a plurality of display screens.

BACKGROUND

Some mobile terminal devices may comprise two display surfaces. When two display surfaces of the mobile terminal devices are externally exposed, inputs on the both display surfaces may be detected. When moving an icon displayed on a first location on a first display screen to a second location on a second display screen, a user may touch the icon with a finger on the first display and slide the finger to a surface of the second display screen while maintaining a contact with the icon with the finger. Even if a distance between the first location and the second location is long, the user needs to touch and move the icon while maintaining the touch for a long duration.

SUMMARY

A method for controlling a display for a mobile terminal device is presented. A first input to a first display module is detected, and a second input to the second display module is detected. The first input is for moving an image displayed on the first display module. The image is moved to a second location of the second input to the second display module, if the second input is detected after the first input when the image is displayed on the first display module.

In this manner, an operation of moving an image form one display module to another display module is expedited. Thus, even if a distance between the first location and the second location is long, the user does not need to touch and move the icon while maintaining the touch for a long duration.

In another embodiment, a mobile terminal device, comprises a first display module, a second display module, a first display module, a first detection module, a second detection module, and a display control module. The first detection module detects a first input to the first display module, and the second detection module operable to detect a second input to the second display module. The first input is for moving an image displayed on the first display module. The display control module controls a display on the first display module and the second display module. The display control module also moves the image to a second location of the second input to the second display module, if the second detection module detects the second input after the first detection module detects the first input when the image is displayed on the first display module.

In an embodiment, a method for controlling a display for a mobile terminal device detects a first input to a first display module, and detects a second input to the second display module. The first input is for moving an image displayed on the first display module. The method further moves the image to a second location of the second input to the second display module, if the second input is detected after the first input when the image is displayed on the first display module.

In a further embodiment, a computer readable storage medium comprises computer-executable instructions for operating a communication device. The method executed by the computer-executable instructions detects a first input to a first display module, and detects a second input to the second display module. The first input is for moving an image displayed on the first display module. The method executed by the computer-executable instructions further moves the image to a second location of the second input to the second display module, if the second input is detected after the first input when the image is displayed on the first display module.

BRIEF DESCRIPTION OF THE DRAWINGS

Embodiments of the present disclosure are hereinafter described in conjunction with the following figures, wherein like numerals denote like elements. The figures are provided for illustration and depict exemplary embodiments of the present disclosure. The figures are provided to facilitate understanding of the present disclosure without limiting the breadth, scope, scale, or applicability of the present disclosure.

DETAILED DESCRIPTION

The following description is presented to enable a person of ordinary skill in the art to make and use the embodiments of the disclosure. The following detailed description is exemplary in nature and is not intended to limit the disclosure or the application and uses of the embodiments of the disclosure. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the disclosure. The present disclosure should be accorded scope consistent with the claims, and not limited to the examples described and shown herein.

Embodiments of the disclosure are described herein in the context of one practical non-limiting application, namely, a mobile electronic device such as a mobile phone. Embodiments of the disclosure, however, are not limited to such mobile phone, and the techniques described herein may be utilized in other applications. For example, embodiments may be applicable to digital books, digital cameras, electronic game machines, digital music players, personal digital assistance (PDA), personal handy phone system (PHS), lap top computers, TV's, GPS's or navigation systems, health equipment, and the like. As would be apparent to one of ordinary skill in the art after reading this description, these are merely examples and the embodiments of the disclosure are not limited to operating in accordance with these examples. Other embodiments may be utilized and structural changes may be made without departing from the scope of the exemplary embodiments of the present disclosure.

Figure 1:
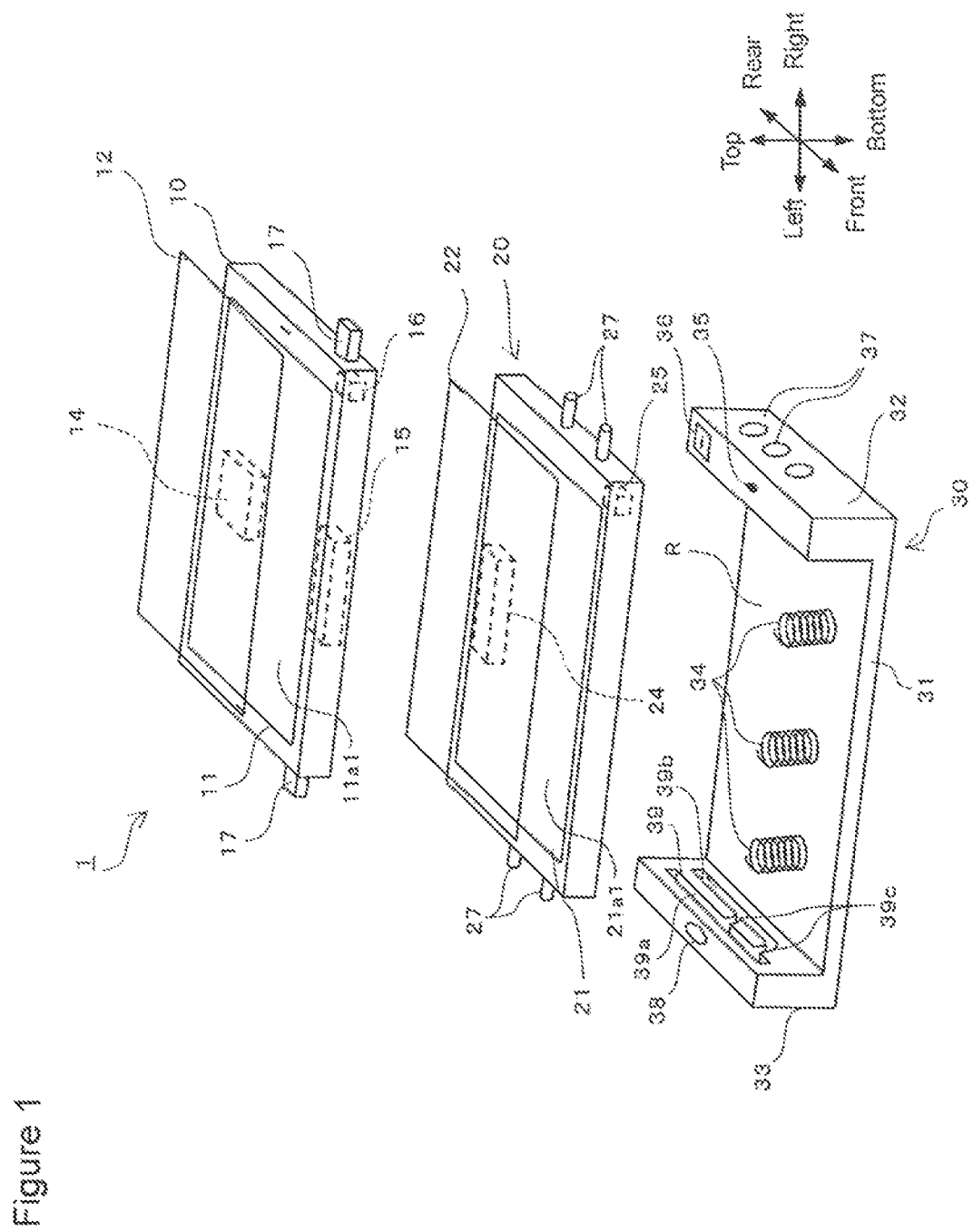
FIG. 1 is an illustration of an exploded perspective view of an exemplary mobile electronic device according to an embodiment of the disclosure.

FIG. 1 is an illustration of an exploded perspective view of an exemplary mobile electronic device according to an embodiment of the disclosure.

According to an embodiment, the mobile phone 1 includes a first cabinet 10, a second cabinet 20, and a supporter 30 which holds the first and the second cabinets 10 and 20.

The first cabinet 10 may have a horizontally long, cuboid shape. A first touch panel is located in front of the first cabinet 10. The first touch panel includes a first display 11 and a first touch sensor 12.

The first display 11 can display an image on a first display surface 11a1. The first display 11 may include a first liquid crystal panel 11a and a first backlight 11b. The first display surface 11a1 is located in front of the first liquid crystal panel 11a. The first touch sensor 12 is overlaid on top of the first display surface 11a1. The first backlight 11b includes one or more light sources and illuminates the first liquid crystal panel 11a.

The first touch sensor 12 (first detector module) can detect an input to the first display 11 (first display module 21). The first touch sensor 12 is a transparent, rectangular sheet and covers the first display surface 11a1 of the first display 11. The first touch sensor 12 may include a first transparent electrode and a second transparent electrode arranged in a matrix configuration to form a capacitance. The first touch sensor 12 can detect a location on the first display surface 11a1 where a user touches, and output location signals corresponding to the location by detecting the change of the capacitance between these transparent electrodes. A user touching the first display surface 11a1 refers to, for example, a user placing a touching object such as, but without limitation, a pen, a finger, or other object, on the first display surface 11a1. The touching object or the finger may stand still or be moving on the first display surface 11a1. The touching object or the finger may touch on the first display surface 11a1 for a short or long time.

The first cabinet 10 may include a camera module 14 in the middle and slightly toward the rear position of the inside thereof. The first cabinet 10 may also include a lens window (not shown in the figure) to take in a subject image in this camera module 14 on the bottom surface thereof.

The first cabinet 10 may include a first magnet 15 in the middle position in a vicinity of a front surface thereof, and a magnet 16 at a right front corner thereof. The first cabinet 10 includes protruding members 17 on a right side and on a left side of the first cabinet 10.

The second cabinet 20 has a horizontally long and cuboid shape and has nearly the same shape and the size of the first cabinet 10. The second cabinet 20 includes a second touch panel. The second touch panel includes a second display 21 and a second touch sensor 22.

The second display 21 can display an image on the second display surface 21a1. The second display 21 may include a second liquid crystal panel 21a and a second backlight 21b. The second display surface 21a1 is located in front of the second liquid crystal panel 21a. The second backlight 21b may include one or more light sources and illuminates the second liquid crystal panel 21a. The first display 11 and the second display 21 may include a display element such as an organic electro luminous (EL) panel.

The second touch sensor 22 (second detector module 22) detects an input to the second display 21 (second display module 21). The second touch sensor 22 has nearly the same shape and configuration of the first touch sensor 12. The second touch sensor 22 is overlaid on top of the second display surface 21a1 of the second display 21. The second touch sensor 22 also detects a location on the second display surface 21a1 where a user touches and outputs location signals corresponding to the location.

The second cabinet 20 may include a magnet 24 in the middle position in a vicinity of a rear surface thereof. The third magnet 24 and the first magnet 15 are arranged to attract to each other in an open state described below.

A closed sensor 25 is arranged at the right front corner in the second cabinet 20. The closed sensor 25 includes, for example, but without limitation, a Hall effect integrated circuit (IC), or other sensor, and outputs sensor signals upon detection of the magnetic force of the magnet 16. In the closed state described below, the magnet 16 in the first cabinet 10 approaches closely to the closed sensor 25, and as a result, the closed sensor 25 outputs sensor signals to a CPU 100. On the other hand, in the open state, the magnet 16 in the first cabinet 10 moves away from the closed sensor 25, and the closed sensor 25 does not output sensor signals.

The second cabinet 20 includes two shanks 27 respectively at both side surfaces thereof.

The supporter 30 includes a base plate module 31, a right holding module 32 located at a right edge of the base plate module 31, a left holding module 33 located at a left edge of the base plate module 31.

On the base plate module 31, three coil springs 34 are arranged side by side in a direction from right to left. When the second cabinet 20 is fixed in the supporter 30, these coil springs 34 come in contact with the bottom surface of the second cabinet 20 and provide the force to push the second cabinet 20 upward.

The right holding module 32 includes a microphone 35 and a power key 36 on the top surface thereof, and the left holding module 33 includes a speaker 38 on the top surface thereof. A plurality of hard keys 37 is also located on the outside surface of the right holding module 32.

The right holding module 32 and the left holding module 33 include guide grooves 39 on the inside surfaces thereof (only the side of the left holding module 33 shown in FIG. 1.) The guide grooves 39 include an upper groove 39a, a lower groove 39b, and two vertical grooves 39c. The upper groove 39a and the lower groove 39b are extended in a longitudinal direction or in a direction from front to rear, and the vertical grooves 39c are extended in the vertical direction or in a direction from top to bottom for connecting the upper groove 39a and the lower groove 39b.

When the mobile phone 1 is assembled, the shanks 27 are inserted into the lower grooves 39b of the guide grooves 39, and the second cabinet 20 is housed in the housing area R of the supporter 30. The protruding members 17 are inserted into the upper grooves 39a of the guide grooves 39. The first cabinet 10 is disposed on top of the second cabinet 20 and housed in the housing area R of the supporter 30.

Thus, the first cabinet 10 and the second cabinet 20 are housed one above the other in the housing area R surrounded by the base plate module 31, the right holding module 32, and the left holding module 33. In this configuration, the first cabinet 10 may slide back and forth guided by the upper grooves 39a. The second cabinet 20 may slide back and forth guided by the lower grooves 39b. When the second cabinet 20 moves forward and the shanks 27 reach to the vertical grooves 39c, the second cabinet 20 may slide up and down guided by the vertical grooves 39c.

Figure 2:
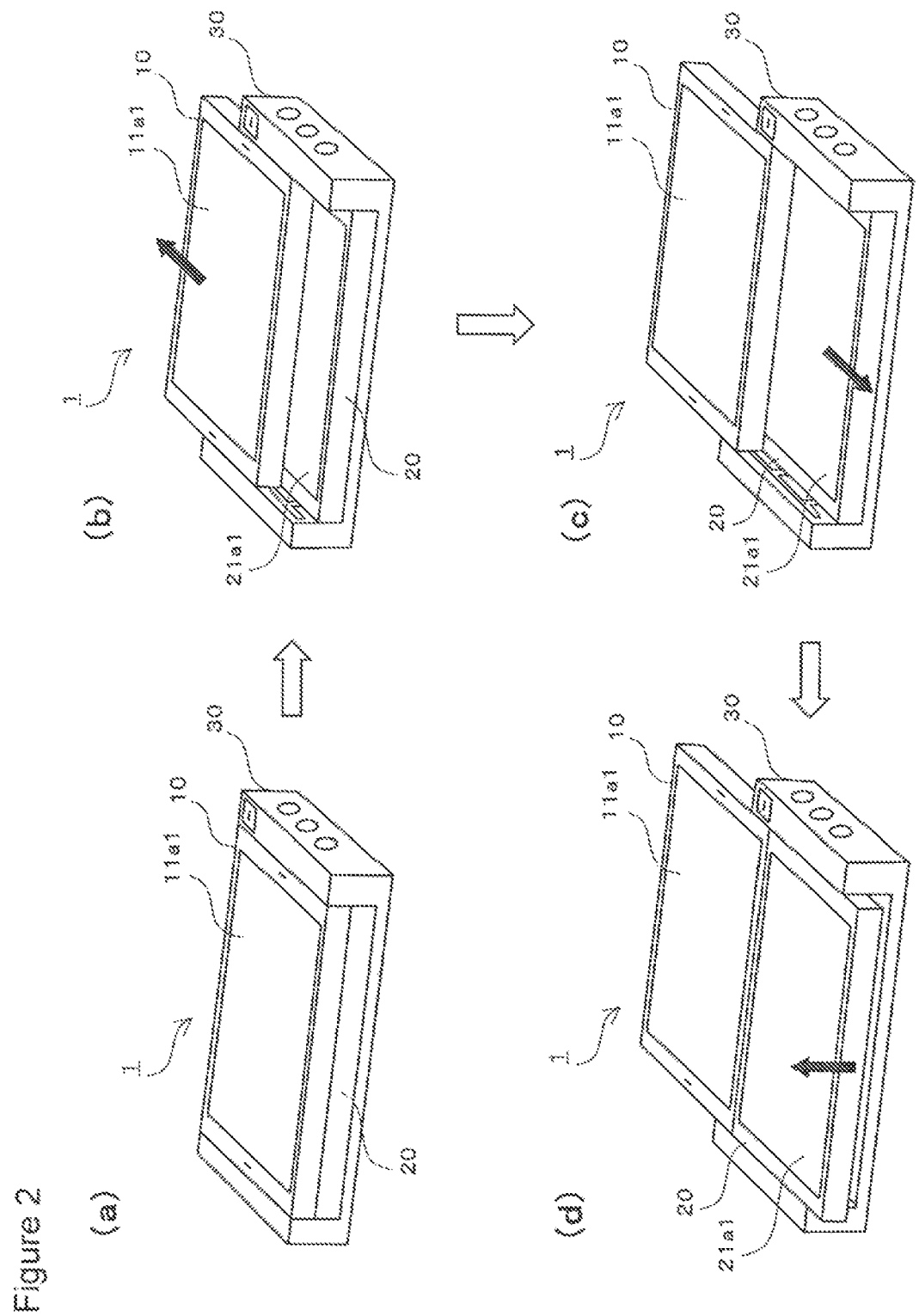
FIGS. 2(a) to 2(d) are illustrations of perspective views of an exemplary electronic device in a separated-flat state according to an embodiment of the disclosure.

FIGS. 2(a)-(d) are illustrations of the mobile phone 1 showing a switching operation from a closed state (FIG. 2(a)) to an open state (FIG. 2(d)).

In the closed state shown in FIG. 2(a), the first cabinet 10 is superimposed on top of the second cabinet 20, and the mobile phone 1 is folded. In the closed state, the second display surface 21a1 is covered with the first cabinet 10, and the first display surface 11a1 alone is exposed outside.

The first cabinet 10 moves backward in the direction of an arrow shown in FIG. 2(b), and the second cabinet 20 is pulled forward in the direction of an arrow shown in FIG. 2(c). When the closed sensor 25 no longer detects the magnetic force of the magnet 16 and outputs sensor signals, the mobile phone 1 is switched to an open state. In this open state, a part of the second display surface 21a1 is exposed outside.

When the second cabinet no longer completely overlaps with the first cabinet 10, the shanks 27 shown in FIG. 1 reach the vertical grooves 39c. Hence, the shanks 27 move along the vertical grooves 39c, and the second cabinet 20 is able to move up and down. At this time, the second cabinet 20 moves upward due to the elastic force of the coil springs 34 and the attracting force of the magnet 15 and the magnet 24.

As shown in FIG. 2(d), the first cabinet 10 and the second cabinet 20 are aligned and in contact with each other, and the second display surface 21a1 becomes as high as the first display surface 11a1. Thus, the first cabinet 10 and the second cabinet 20 are expanded, and the first display surface 11a1 and the second display surface 21a1 are both exposed outside.

In the open state, as shown in FIG. 2(b)-(d), at least a part of the second display surface 21a1 and the first display surface 11a1 are exposed outside.

Figure 3:
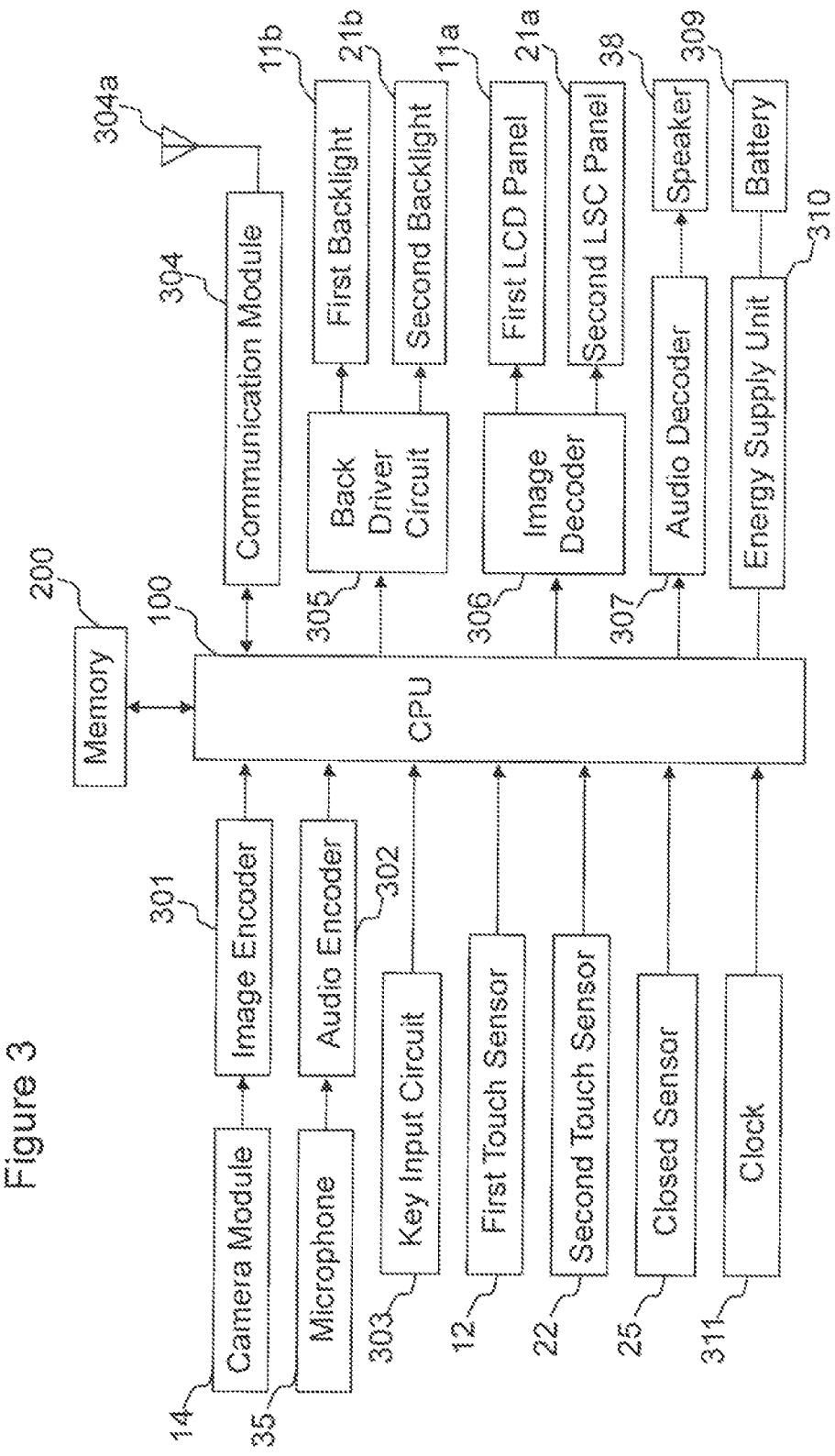
FIG. 3 is an illustration of an exemplary schematic functional block diagram of a mobile electronic device according to an embodiment of the disclosure.

FIG. 3 is an illustration of an exemplary schematic functional block diagram of the mobile phone 1 according to an embodiment of the discourse. The mobile phone 1 includes a CPU 100, a memory 200, an image encoder 301, an audio encoder 302, a key input circuit 303, a communication module 304, a backlight drive circuit 305, an image decoder 306, an audio decoder 307, a battery 309, a power supply module 310, and a clock 311 in addition to the components described above.

The camera module 14 may include an image sensor, such as a charge-coupled device (CCD). The camera module 14 digitalizes imaging signals output from the image sensor, performs various corrections for the imaging signals, such as a gamma correction, and outputs the corrected imaging signals to the image encoder 301. The image encoder 301 performs an encoding process on the imaging signals from the camera module 14 and outputs the encoded imaging signals to the CPU 100.

The microphone 35 converts collected sounds into audio signals and outputs the converted audio signals to the audio encoder 302. The audio encoder 302 converts the analog audio signals from the microphone 35 into the digital audio signals while performing the encoding process on the digital audio signals and outputting the encoded digital audio signals to the CPU 100.

When a power key 36 or one of hard keys 37 is pressed, the key input circuit 303 outputs an input signal corresponding to each key to the CPU 100.

The communication module 304 converts data from the CPU 100 into wireless signals and transmits the converted signals to base stations through an antenna 304a. The communication module 304 also converts wireless signals received through the antenna 304a into data and outputs the data to the CPU 100.

The backlight drive circuit 305 applies the voltage corresponding to the control signals from the CPU 100 to the first backlight 11b and the second backlight 21b. The first backlight 11b is lit up due to the voltage by the backlight drive circuit 305 and illuminates the first liquid crystal panel 11a. The second backlight 21b is lit up due to the voltage by the backlight drive circuit 305 and illuminates the second liquid crystal panel 21a.

The image decoder 306 converts image data from the CPU 100 into image signals that may be displayed on the first liquid crystal panel 11a and on the second liquid crystal panel 21a and outputs the image signals to the liquid crystal panels 11a and 21a. The first liquid crystal panel 11a displays images corresponding to the image signals on the first display surface 11a1. The second liquid crystal panel 21a displays images corresponding to the image signals on the second display surface 21a1.

The audio decoder 307 performs a decoding process on audio signals from the CPU 100 and sound signals of various notification sounds, such as a ringtone or an alarm sound. The audio decoder 307 further converts the decoded audio signals and/or sound signals to analog signals and outputs the analog signals to the speaker 38. The speaker 38 plays the audio signals and/or the sound signals from the audio decoder 307.

The battery 309 can provide electric power to the CPU 100 and/or each component other than the CPU 100 and includes a secondary cell. The battery 309 is connected to the power supply module 310.

The power supply module 310 converts the voltage of the battery 309 into the voltage level that each component requires and provides thus converted voltage to each component. The power supply module 310 can provide electric power from an external power source (not shown) to the battery 309 and charges the battery 309.

The clock 311 measures time and outputs the signals corresponding to the measured time to the CPU 100.

The memory 200 may be any suitable data storage area with suitable amount of memory that is formatted to support the operation of an electronic device such as the mobile phone 1. The memory 200 is configured to store, maintain, and provide data as needed to support the functionality of the mobile phone 1 in the manner described below. In practical embodiments, the memory 200 may comprise, for example but without limitation, a non-volatile storage device (non-volatile semiconductor memory, hard disk device, optical disk device, and the like), a random access storage device (for example, SRAM, DRAM), or any other form of storage medium known in the art. The memory 200 stores a control program providing a control function to the CPU 100.

The CPU 100 is configured to support functions of an electronic device such as the mobile phone 1. For example, the CPU 100 executes a process for moving an icon on the respective display surfaces 11a1 and 21a1. For another example, the CPU 100 operates the camera module 14, the microphone 35, the communication module 304, the liquid crystal panel 11a and 21a, and the speaker 38 based on the input signals from the key input circuit 303, and the location signals from the respective touch sensors 12 and 22 in accordance with the control program. Thus, the CPU 100 executes various applications, such as a phone call function, an e-mail function, a key-lock function, or other function.

The CPU 100, may be implemented or realized with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

The CPU 100, as a setting module, sets an input to the respective display surfaces 11a1 and 21a1 to a valid input or an invalid input. When an input to the respective display surfaces 11a1 and 21a1 is set to a valid input, an operation according to the input location is executed. When an input to the respective display surfaces 11a1 and 21a1 is set to an invalid input, an operation according to the input location is not executed.

Invalidity of an input includes a case where the respective touch sensors 12 and 22 do not detect an input by a user and a case where the CPU 100 does not execute an operation according to an input from the respective touch sensors 12 and 22 although the respective touch sensors 12 and 22 detect the input.

For example, when an input is entered to one of the display surfaces 11a1 and 21a1, an input entered on the other display surface 11a1 or 21a1 is set to an invalid input.

When an input to one of the display surface 11a1 and 21a1 is entered to an image indicating a prescribed function (predefined function). function by a predefined action, a moving process of the image begins. In the moving process, an input for moving an image is set to a valid input, inputs other than the input for moving the image is set to an invalid input.

Images indicating a predefined function include, but are not limited to, icons and widgets. Widgets may comprise, for example but without limitation, clock widgets, calendar widgets, dictionary widgets, calculator widgets, widgets showing contents of received emails, widgets showing contents of posting on Social Networking Services (SNS), widgets displaying data of stock prices, widgets displaying news and weather, or other widget.

A predefined action refers to an operation for specifying an image indicating a predefined function and for starting a moving process of the specified image. Examples of a predefined action include touching an image indicating a predefined function with a finger for a given length of time from touching a display surface to releasing it, moving a finger while maintaining the contact with a display surface with a finger in such a way as to encompass a vicinity of an image indicating a predefined function, and touching an image indicating a predefined function a predefined number of times within a predefined time.

The CPU 100, as a display control module, outputs control signals to the image decoder 306 and the backlight drive circuit 305. For example, the CPU 100 controls the backlight drive circuit 305 and turns off the respective backlights 11b and 21b. On the other hand, while lighting up the respective backlights 11b and 21b, the CPU 100 controls and causes the image decoder 306 to display an image on the respective display surfaces 11a1 and 21a1. The CPU 100 also controls contrast, brightness, a screen size, and transparency of a screen when an image is displayed on the respective display surface 11a1 and 21a1.

The CPU 100, controls a display on respective display surface 11a1 and 21a1. For example, CPU 100 displays an image indicating a predefined function on the respective display surface 11a1 and 21a1. When a moving process for an image begins, and when an input for moving the image is set to a valid input, the CPU 100 also moves a location where the image is displayed to a location where the input is entered.

Figure 4:
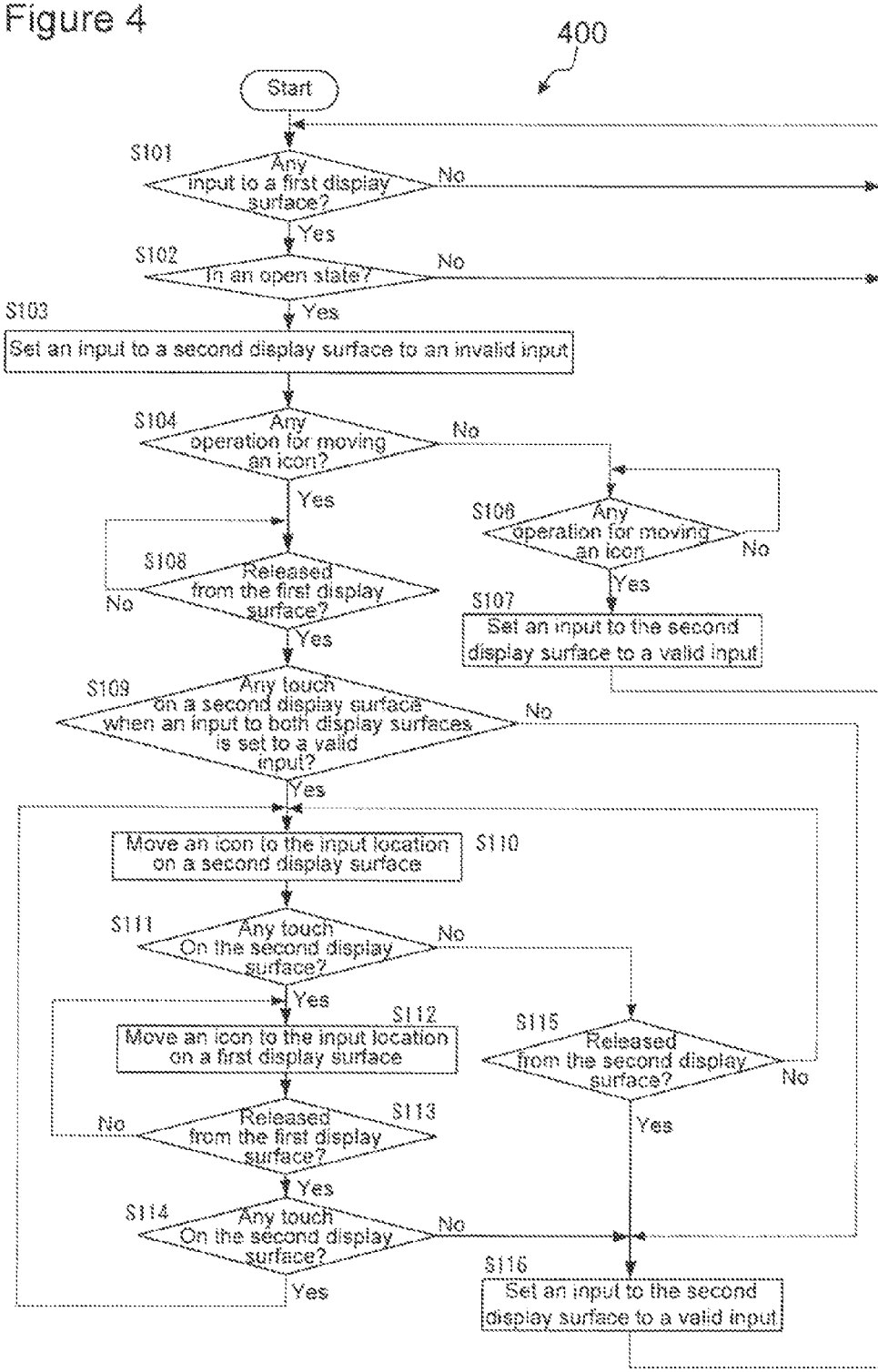
FIG. 4 is an illustration of an exemplary flow diagram showing a process to move an icon according to an embodiment of the disclosure.

FIG. 4 is an illustration of an exemplary flowchart 400 showing a process for moving an icon that can be performed by the CPU 100 on the respective display surfaces 11a1 and 21a1.

FIG. 5(a) is an illustration showing a finger touching an icon on the first display surface 11a1 for more than a predefined time. FIG. 5(b) is an illustration showing another finger touching on the second display surface 21a1. FIG. 5(c) is an illustration showing an icon being moved to an input location on the second display surface 21a1. FIG. 5(d) is an illustration showing an icon being moved to an input location on the first display surface 11a1.

The various tasks performed in connection with the process 400 may be performed by software, hardware, firmware, a computer-readable medium having computer executable instructions for performing the process method, or any combination thereof. The process 400 may be recorded in a computer-readable medium such as a semiconductor memory, a magnetic disk, an optical disk, and the like, and can be accessed and executed, for example, by a computer CPU such as the CPU 100 in which the computer-readable medium is stored.

It should be appreciated that process 400 may include any number of additional or alternative tasks, the tasks shown in FIG. 4 need not be performed in the illustrated order, and process 400 may be incorporated into a more comprehensive procedure or process having additional functionality not described in detail herein. In practical embodiments, portions of the process 400 may be performed by different elements of the mobile phone 1 such as: the CPU 100, the memory 200, the first display surface 11a1, the second display surface 21a1 etc. Process 400 may have functions, material, and structures that are similar to the embodiments shown in FIGS. 1-3. Therefore common features, functions, and elements may not be redundantly described here.

First, an input to the first display surface 11a1 is monitored (S101). For example, when a user touches on the first display surface 11a1, the CPU 100 receives location signals from the first touch sensor 12 and determines that an input is entered to the first display surface 11a1 (S101: YES).

Then, if the mobile phone 1 is in the closed state when an input is entered (S102: NO), the CPU 100 returns to the process of S101 and continues to monitor an input (S101) because an icon is not moved between the display surfaces 11a1 and 21a1.

On the other hand, if the mobile phone 1 is in the open state (S102: YES), an input to the second display surface 21a1 is set to an invalid input (S103). Thus, it is prevented that an input is mistakenly entered on the second display surface 21a1 and that the process according to the input is executed although a user performs an operation for moving an icon on the first display surface 11a1.

Then it is determined whether or not an icon on the first display surface 11a1 is touched for longer than a predefined time in order to determine whether or not an operation for moving an icon is performed (S104).

For example, if an icon on the first display surface 11a1 is touched with a finger, and if the finger is released from the touch within a predefined time, it is determined that a operation for moving the icon is not performed (S104: NO). Even if a finger touches an area other than an icon on the first display surface 11a1 for longer than a predefined time, it is also determined that an operation for moving an icon is not performed (S104: NO). In these cases, an input to the second display surface 21a1 is set to an invalid input until a finger is released from the first display surface 11a1 (S106: NO). On the other hand, once a finger is released from the first display surface 11a1 (S106: YES), an input to the second display surface 21a1 that is set to an invalid input is set to a valid input (S107), and a process returns to S101.

In a process of S104, as shown in FIG. 5(a), when a user touches an icon with a finger for longer than a predefined time, it is determined that a operation for moving an icon is performed (S104: YES). Thus, a process for moving the touched icon is executed. However, while the first display surface 11a1 is touched (S108: NO), an input to the second display surface 21a1 is set to an invalid input. For this reason, as shown in FIG. 5(b), even if a finger touches the second display surface 21a1, an icon does not move to the second display surface 21a1.

When a finger is released from the first display surface 11a1 (S108: YES), an input to the both display surfaces 11a1 and 21a1 for moving an icon is set to a valid input. If the second display surface 21a1 has been touched when the CPU 100 sets an input to the display surfaces 11a1 and 21a1 to a valid input (S109: YES), an icon is moved to the input location on the second display surface 21a1 as shown in FIG. 5(c) (S110).

Figure 5:
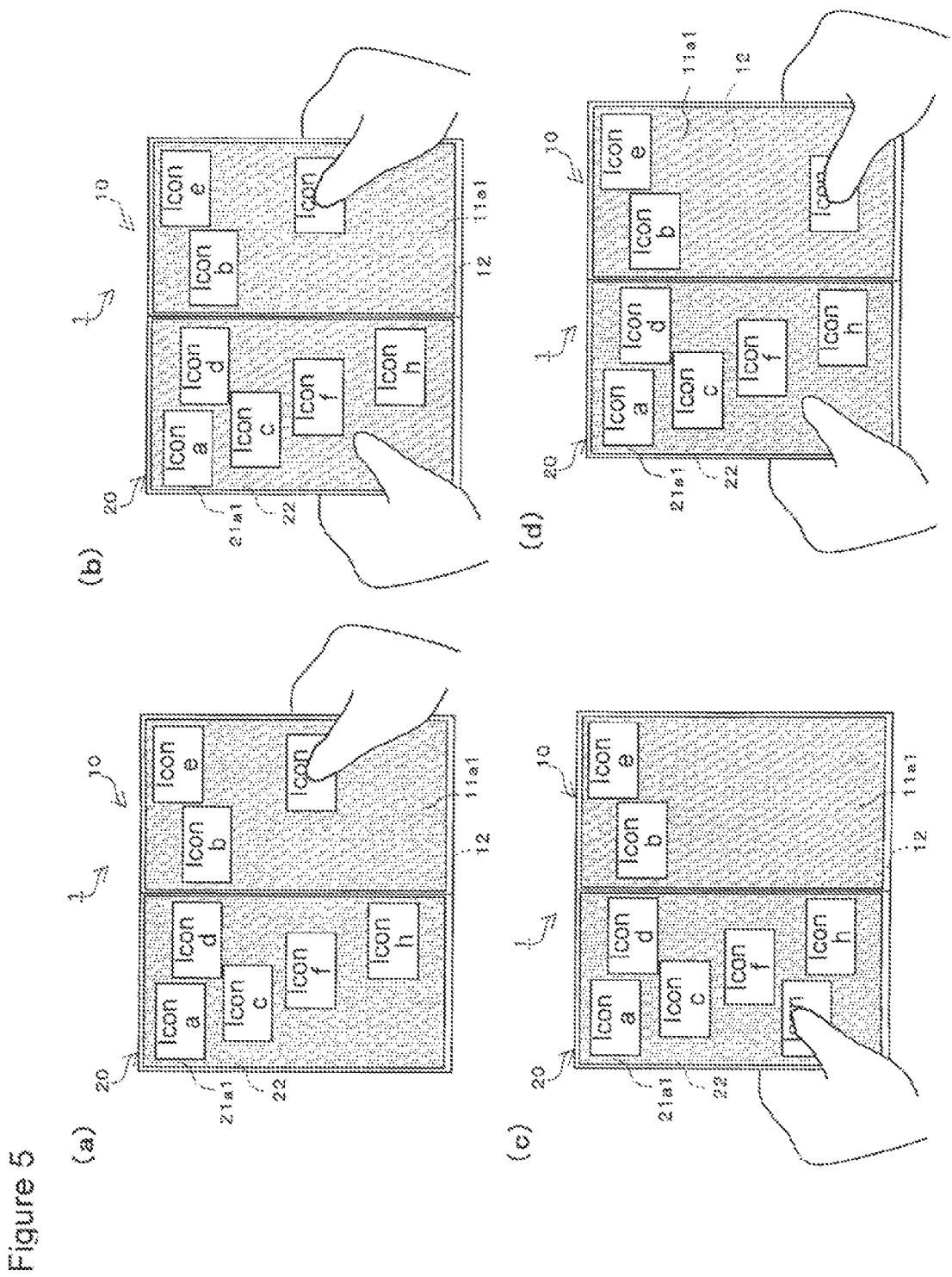
FIGS. 5(a) to 5(d) are illustrations of an exemplary mobile electronic device showing a process to move an icon according to an embodiment of the disclosure.

If the first display surface 11a1 is touched again after an icon moves to the second display surface 21a1 (S111: YES), the icon moved to the second display surface 21a1 moves to the input location on the first display surface 11a1 (S112) as shown in FIG. 5 (d). Hence, even if the second display surface 21a1 remains touched, an input to the first display surface 11a1 has a priority, and an icon returns from the second display surface 21a1 to the first display surface 11a1.

If a finger has been touching the second display surface 21a1 (S114: YES) when a finger touching the first display surface 11a1 is released (S113: YES), an icon moves to an input location on the second display surface 21a1 (S110), as shown in FIG. 5 (c).

If a finger moves on the first display surface 11a1 while the finger is not released from the first display surface 11a1 (S113: NO), a display location of an icon moves on the first display surface 11a1 according to the input location (S112).

In the process of S111, if the first display surface 11a1 is not touched by a (S111: NO), and if a finger that has touched the second display surface 21a1 is not released (S115: NO), the second display surface 21a1 alone is touched. For this reason, when the finger moves on the second display surface 21a1, an icon moves on the second display surface 21a1 according to the input location on the second display surface 21a1 (S110).

Furthermore, in the process of S109, if the second display surface 21a1 is not touched by a finger when an input to the both display surfaces 11a1 and 21a1 are set to a valid input (S109: NO), the both display surfaces 11a1 and 21a1 are not touched. In the process of S115, when a finger is released from the second display surface 21a1 (S115: YES), the both display surfaces 11a1 and 21a1 are also not touched. In addition, in the process of S114, if the second display surface 21a1 is not touched (S114: NO), the both display surfaces 11a1 and 21a1 are not touched. In such cases where the both display surfaces 11a1 and 21a1 are not touched (S109: NO, S115: YES, and S114: NO), a process for moving an icon is terminated, and an input to the both display surfaces 11a1 and 21a1 is set to a valid input (S116).

In conclusion, according to the present embodiment, a moving process for an icon is started by touching an icon on the first display surface 11a1 for longer than a predefined time. For this reason, when the second display surface 21a1 is touched, the icon on the first display surface 11a1 is moved to the input location on the second display surface 21a1. Thus, a user is able to move an icon to an input location by touching the respective display surfaces 11a1 and 21a1, and the present embodiment excels at operability.

In addition, according to the present embodiment, if the first display surface is touched once more after an icon on the first display surface 11a1 is moved to the second display surface 21a1 by releasing a finger from the first display surface, the icon returns to the first display surface. Thus, a user is able to return an icon to the first display surface without performing an operation for moving the icon which has been moved to the second display surface.

Furthermore, as shown in FIG. 5(a)-FIG. 5(d), if a user touches the respective display surfaces 11a1 and 21a1 with a thumb, he/she is able to touch an icon to be moved or able to touch a destination of the icon while holding the mobile phone 1 with both hands, and the present embodiment excels at convenience.

In addition, according to the present embodiment, when an input to the first display surface 11a1 is detected, an input to the second display surface 21a1 is set to an invalid input. Thus, even if a user mistakenly touches the second display surface 21a1 while touching an icon on the first display surface 11a1 for moving it, an operation according to the input to the second display surface 21a1 is not executed. Thus, an operation for moving an icon may be performed while a false operation is prevented.

Furthermore, according to the present embodiment, during an execution of a moving process for an icon, an input for moving an icon is set to a valid input, but other inputs are set to an invalid input to the second display surface 21a1. Therefore, an icon is moved to a location where a user intend's, while a false operation is prevented.

Although the present embodiment is described above, the subject invention is not limited to the aforementioned embodiment. Embodiments of the subject invention may be varied aside from the above embodiment.

For example, in the above embodiment, if the first display surface 11a1 is touched, and if the mobile phone 1 is in an open state, an input to the second display surface 21a1 is set to an invalid input. In contrast, if an icon on the first display surface 11a1 is touched in an open state, an input to the second display 21a1 may be set to an invalid input.

In the above embodiment, if an input is entered to the first display surface 11a1, an input to the second display surface 21a1 is set to an invalid input. However, an input to the second display surface 21a1 may continue to be set to a valid input.

In this case, if an icon on the second display surface 21a1 is touched before a lapse of a predefined time after an icon on the first display surface 11a1 is touched, an application according to the icon is executed. An operation for moving an icon on the first display surface 11a1 is canceled.

Even if an area other than an icon on the second display surface 21a1 is touched before a lapse of a predefined time after an icon on the first display surface 11a1 is touched, there is no operation to be executed according to the input location.

For this reason, when a predefined time lapses after the first display surface 11a1 is touched, an operation for moving an icon on the first display surface 11a1 is started, and the icon is moved to the input location on the second display surface 21a1.

Furthermore, if the second display surface 21a1 is not touched before a predefined time lapses after an icon on the first display surface 11a1 is touched, an operation for moving an icon on the first display surface 11a1 is started, when the predefined time lapses after the first display surface 11a1 is touched. Then, within a predefined time after the process begins, or before a predefined operation is performed, a moving process for an icon is executed, and the icon is moved to the input location when the second display surface 21a1 is touched.

Furthermore, in the above embodiment, when it is determined that an operation for moving an icon is not performed, an input to the second display surface 21a1 is set to an invalid input until a finger is released from the first display surface 11a1. On the other hand, when it is determined that an operation for moving an icon is not performed, an input to the second display surface 21a1 may be set to a valid input.

In the above embodiment, when an icon is touched for longer than a predefined time, a process for moving an icon is started. However, an input to the second display surface 21a1 is set to an invalid input until a finger is released from the first display surface 11a1. In contrast, when a process for moving an icon begins, an input to the second display surface 21a1 may be set to a valid input. In this case, when the second display surface 21a1 is touched at or after the onset of a process for moving an icon, the icon is moved to the input location on the second display surface 21a1.

In addition, in the above embodiment, when a process for moving an icon is started, an input for moving an icon to the both display surfaces 11a1 and 21a1 is set to a valid input, and inputs other than this are set to an invalid input. In contrast, all inputs on the respective display surfaces 11a1 and 21a1 may be set to a valid input. In this case, if a location where an icon is not displayed is touched, an icon is moved, and if an icon is touched, a process for moving an icon is terminated and a process according to the touched icon is executed.

In the above embodiment, if the first display surface 11a1 is touched again when the second display surface 21a1 has been touched after an icon is moved to the second display surface 21a1, an icon also returns to the first display surface 11a1. On the other hand, if the first display surface has been touched when a finger is released from the second display surface 21a1 after an icon is moved to the second display 21a1, an icon may be moved to the first display surface 11a1.

In the above embodiment, if an input to the first display surface 11a1 is monitored, and if an icon on the first display surface 11a1 is touched for longer than a predefined time, a moving process for an icon is started. On the other hand, if an input to the second display surface 21a1 is monitored, and if an icon on the second display surface 21a1 is touched for longer than a predefined time, a process for the first display surface 11a1 and a process for the second display surface 21a1 are switched, and a similar process for moving an icon described above is started.

In the above embodiment, when the first display surface 11a1 is touched, an input to the second display surface 21a1 is also set to an invalid input. On the other hand, when the second display surface 21a1 is touched first, an input to the first display surface 11a1 may be set to an invalid input.

In addition, in the above embodiment, during a moving process for an icon, when the second display surface 21a1 is touched, an icon is moved to the input location. On the other hand, when a folder on the second display surface 21a1 is touched, an icon may be moved into the folder. When a recycle bin icon displayed on the second display surface 21a1 is touched, a process for deleting an icon may be executed. A recycle bin icon is an icon for deleting an image moved on top thereof.

In the above embodiment, the supporter 30 holds the first cabinet 10 and the second cabinet 20 so as to be openable or closeable. However, the present invention is not limited to this embodiment. For example, as shown in FIGS. 6(a) and 7(b), and FIGS. 7(a) and 7(b), the both cabinets 10 and 20 may be connected by a connection part 40.

FIG. 6(a) is an illustration of a perspective view of the mobile phone 1 in a closed state, and FIG. 6(b) is an illustration of a perspective view of the mobile phone 1 in an open state. FIG. 7(a) is an illustration of a perspective view of the mobile phone 1 in a tilt state viewed from the front side of the first cabinet 10. FIG. 7(b) is an illustration of a perspective view of the mobile phone 1 in a tilt state viewed from the back side of the first cabinet 10.

A central frame 41 in the connection part 40 has a horizontally long shape extending in a direction from right to left. The right side of the central frame 41 is connected to an edge of a first right frame 42 and to an edge of a second right frame 44. The left side of the central frame 41 is connected to an edge of a first left frame 43 and to an edge of a second left frame 45.

The other edges of the first right frame 42 and the first left frame 43 respectively include shanks extending in a direction from right to left (not shown). These shanks are inserted in grooves 18 disposed on the right and left side surfaces of the first cabinet 10 and hold the first cabinet 10 such that the first cabinet 10 may move and slide along the grooves 18. Thus, the first cabinet 10 is held by the first right frame 42 and the first left frame 43 so that the first cabinet 10 may rotate around an axis and to slide up and down along the grooves 18.

The second cabinet 20 is held by the second right frame 44 and the second left frame 45 so that the second cabinet 20 may rotate around an axis extending in a direction from right and left.

Figure 8:
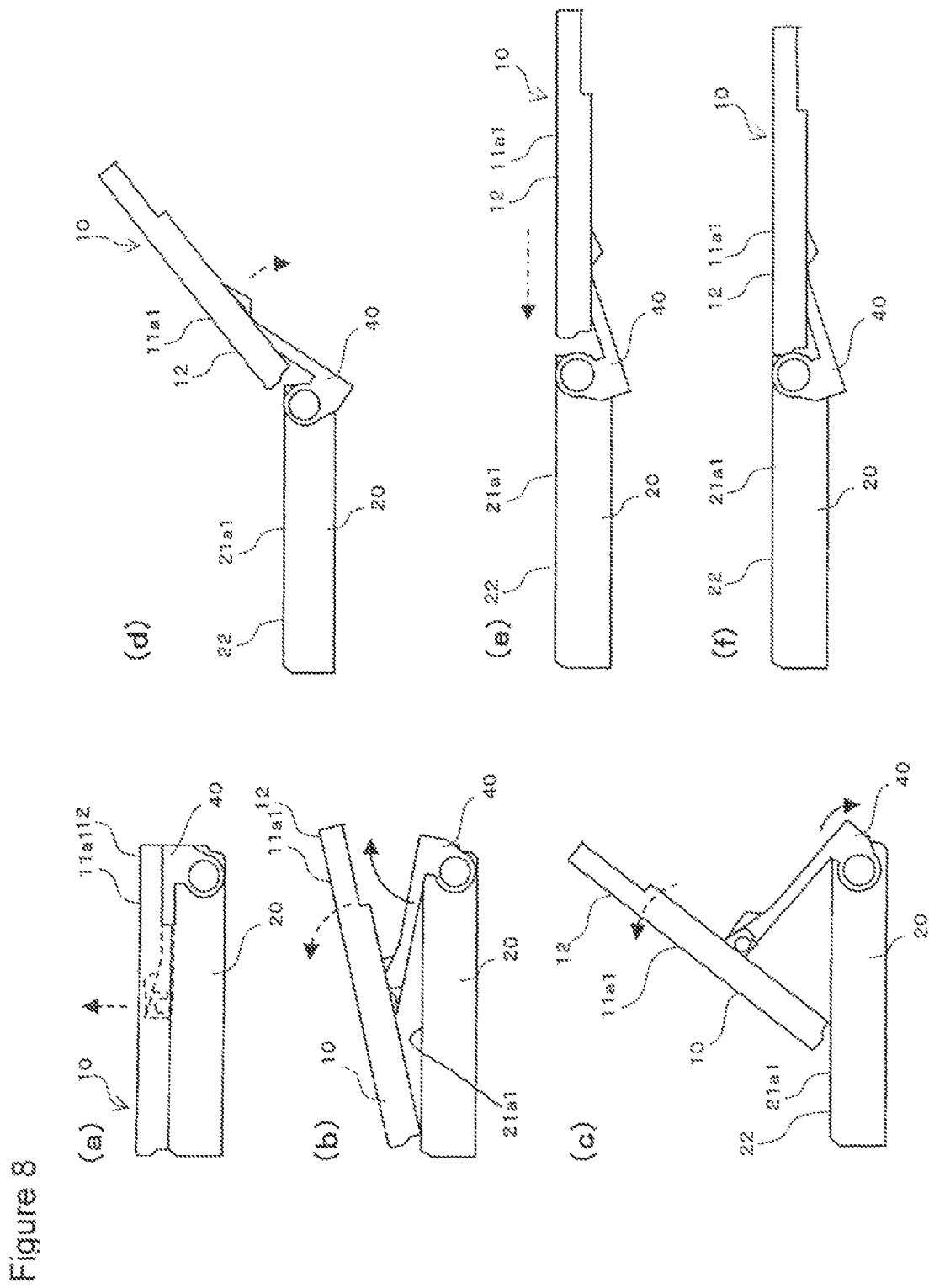
FIGS. 8(a) to 8(f) are illustrations of side views of the electronic device to show an operation of changing states of the mobile electronic device according to an embodiment of the disclosure.

As in FIG. 8(a), if the mobile phone 1 is in a closed state, and if the first cabinet 10 is moved forward in a direction of a dashed arrow, the back surface of the first cabinet 10 moves away from the front surface of the second cabinet 20 as shown in FIG. 8(b). At this time, the connection part 40 is rotated clockwise (in a direction of a solid arrow) as the first cabinet 10 moves.

As a dash arrow indicates, when the first cabinet 10 is rotated in such a way that the first display surface 11a1 faces the bottom side, the mobile phone 1 comes into a tilt state in FIG. 8(d) through the configuration in FIG. 8(c). In the tilt state, the bottom side of the back surface of the first cabinet 10 comes into contact with the connection part 40.

If the bottom side of the back surface of the first cabinet 10 remains in contact with the connection part 40, and if the connection part 40 is further rotated clockwise (in a direction of a dash arrow shown in FIG. 8(d)), the first display surface 11a1 and the second display surface 21a1 become almost one surface as shown in FIG. 8(e).

There is a gap (a few millimeters) between the first cabinet 10 and the second cabinet 20 in FIG. 8(e). When the first cabinet 10 slides downward to the second cabinet 20 (in a direction of an alternate long and short dash arrow), the mobile phone 1 comes into an open state as in FIG. 8(f). At this time, the bottom side surface of the first cabinet 10 and the top side surface of the second cabinet 20 touch with each other.

Figure 6:
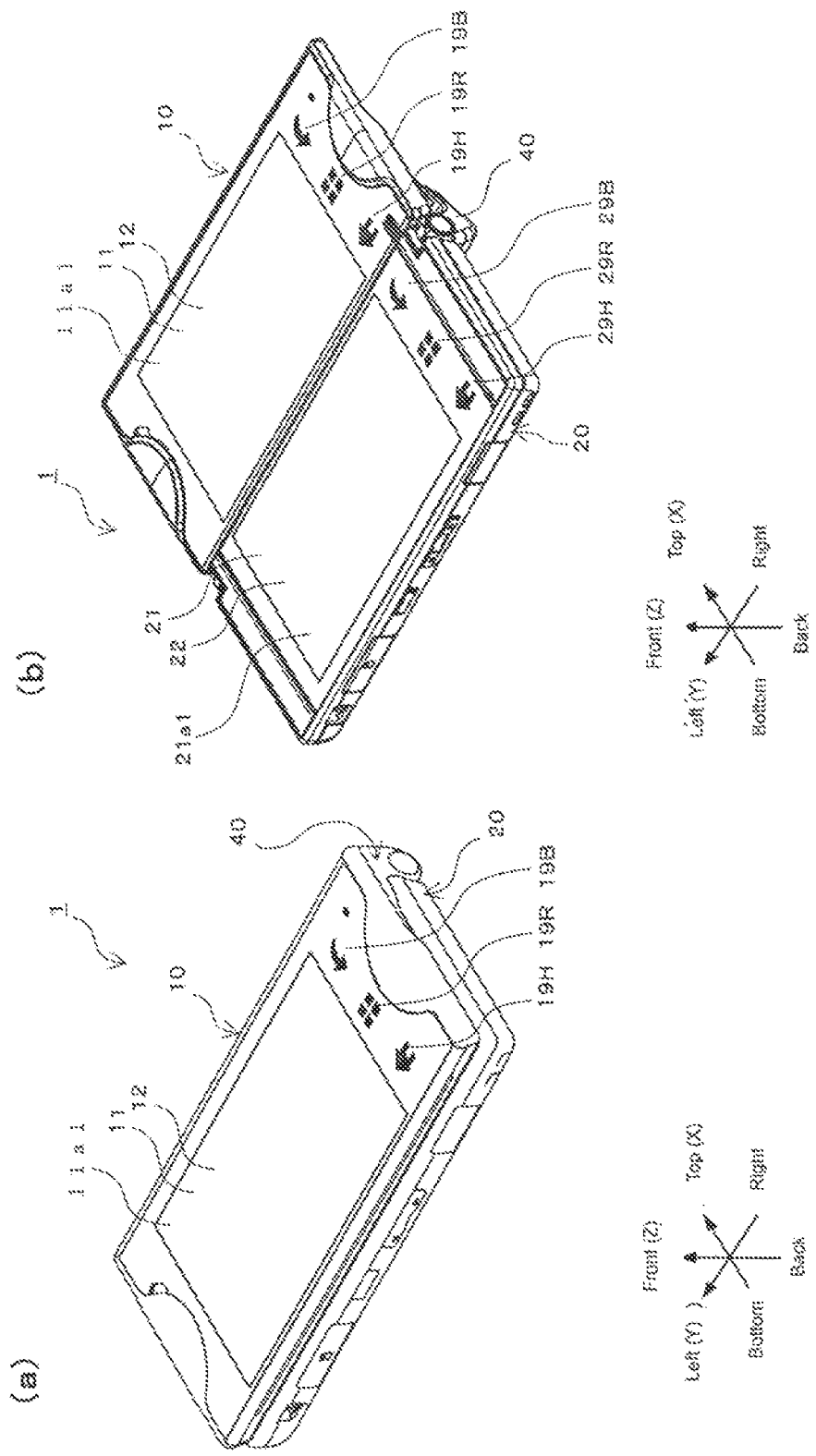
FIGS. 6(a) and 6(b) are illustrations of perspective views of an exemplary mobile electronic device according to an embodiment of the disclosure.
Figure 7:
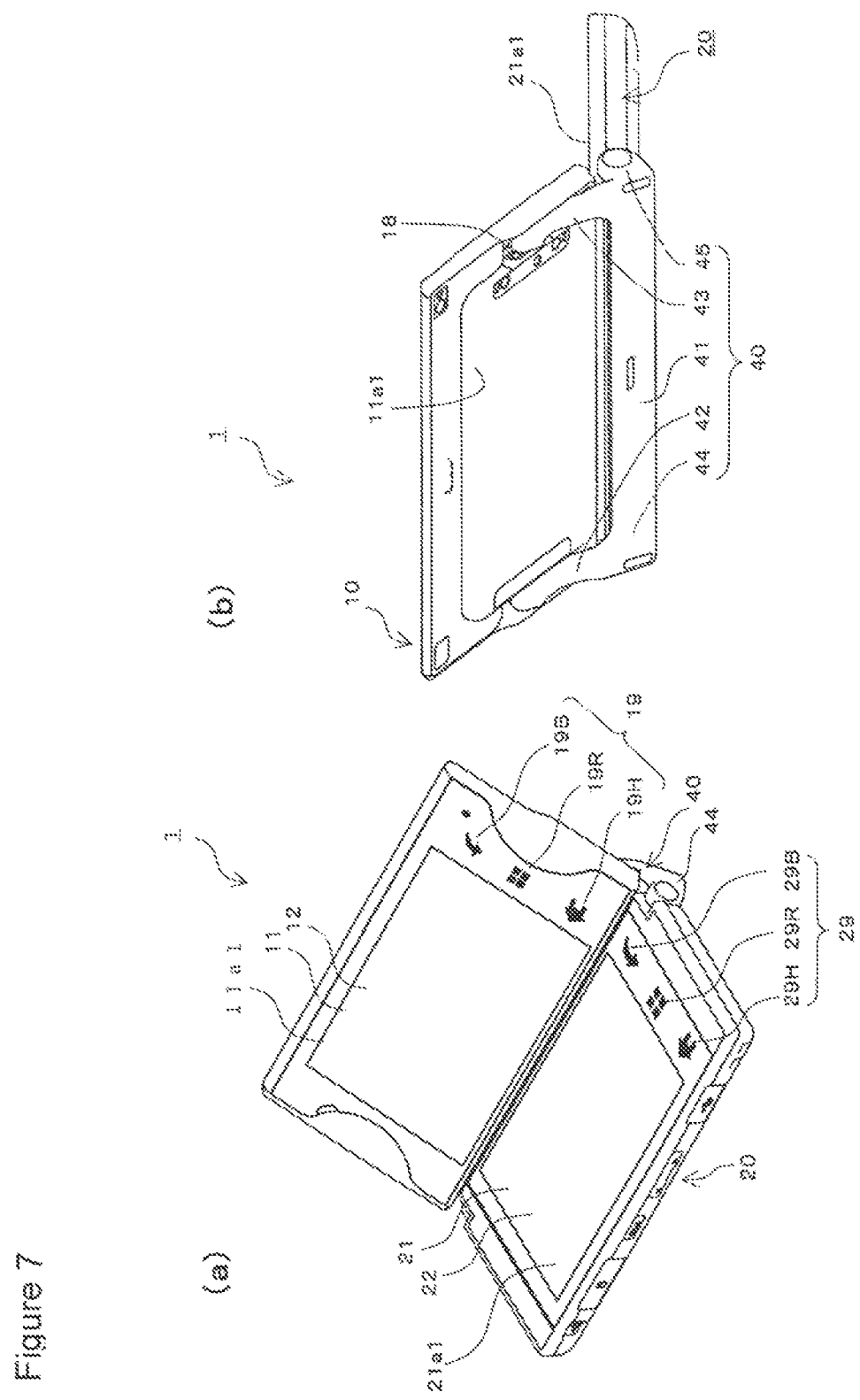
FIGS. 7(a) and 7(b) are illustrations of perspective views of an exemplary mobile electronic device according to an embodiment of the disclosure.

Furthermore, in the above embodiment, key groups 19 and 29 may be arranged on the front surface of the first and the second cabinets 10 and 20 as shown in FIG. 6. The key groups 19 and 29 include home keys 19H and 29H, back keys 19B and 29B, and launcher keys 19R and 29R. When the home keys 19H and 29H are touched, a home screen is display on the first and the second display surfaces 11a1 and 21a1. When the back keys 19B and 29B are touched, a screen displayed on the first and the second display surface 11a1 and 21a1 returns to the previous screen upon execution of an application. When the launcher keys 19R and 29R are touched, an application start screen (a launcher screen) including an icon for starting an application is displayed on the first and the second display surfaces 11a1 and 21a1.

The above-disclosure is not limited to the embodiment. For example and without limitation, the disclosure may be applicable to electronic devices such as a mobile terminal with one display module in one cabinet. Specifically, such a mobile terminal may comprise a first touch area and a second touch area on the display module. The first touch area corresponds to the first display surface 11a1 while the second touch area corresponds to the second display surface 21a1. In this case, the same process described in above embodiments may be performed by the CPU. As a result, a user can move an image on the display to a desired location quickly without moving a finger between two locations on the display surface. This finger moving can be eliminated by two finger touches described in above embodiment of the present disclosure.

Terms and phrases used in this document, and variations hereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future.

Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise.

Furthermore, although items, elements or components of the present disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent. The term "about" when referring to a numerical value or range is intended to encompass values resulting from experimental error that can occur when taking measurements.

The invention claimed is:

1. A mobile terminal device, comprising:
   a first display area and a second display area;
   a first touch sensor area operable to detect a first input to a first location of the first display area and a third input to a third location of the first display area, the first input satisfying a condition for moving an image displayed on the first display area;
   a second touch sensor area operable to detect a second input to a second location of the second display area; and
   a display control module operable to:
      control a display on the first display area and the second display area;
      move the image from the first location to the second location when the second touch sensor area detects the second input after the first touch sensor area detects the first input, and after the first touch sensor area detects a release of the first input while the second touch sensor area continues to detect the second input; and
      move the image from the second location to the third location when the first touch sensor area detects the third input to the first display area while the second touch sensor area continues to detect the second input to the second display area.

2. The mobile terminal device according to claim 1, wherein the first display area and the second display area are exposed externally.

3. The mobile terminal device according to claim 1, wherein the image indicates a prescribed function.

4. The mobile terminal device according to claim 1, further comprising a setting module operable to:
   set the second input an invalid input status when the first touch sensor area detects the first input to the first display area; and
   set the second input to a valid input status when the first input satisfies the condition for moving the image, wherein the display control module is further operable to move the image to the second location after the second input is set to the valid input status.

5. The mobile terminal device according to claim 1, further comprising a setting module operable to:
   set the second input to an invalid input status when the first touch sensor area detects the first input to the first display area; and
   set the second input to a valid input status when the release of the first input is detected, wherein the display control module is further operable to move the image to the second location after the second input is set to the valid input status.

6. The mobile terminal device according to claim 1, further comprising a setting module operable to:
   set the second input to an invalid input status when the first touch sensor area detects the first input to the first display area; and
   set the second input to a valid input status when the first input satisfies the condition for moving the image, wherein the display control module is further operable to not move the image to the second location when the first touch sensor area senses a release of the first input before detection of the second input.

7. A method for controlling a display for a mobile terminal device, the method comprising:
   detecting a first input to a first display area, the first input satisfying a condition for moving an image displayed on the first display area;
   detecting a second input to the second display area; and
   moving the image to a second location of the second input when the second input is detected after the first input is detected, and after the first input is released while the second input continues to be detected;
   detecting a third input to the first display area; and moving the image to a third location of the third input when the third input is detected while the second input continues to be detected.

8. The method of claim 7, wherein the first display area and the second display area are exposed externally.

9. The method of claim 7, wherein the image indicates a prescribed function.

10. The method of claim 7, further comprising:
setting the second input to an invalid input, when the first input to the first display area is detected and does not satisfy the condition for moving the image;
setting the second input to a valid input when the first input satisfies the condition for moving the image; and
moving the image to the second location when the second input is detected and when the second input comprises the valid input.

11. A non-transitory computer readable storage medium comprising computer-executable instructions for operating a communication device, the method executed by the computer-executable instructions comprising:
detecting a first input to a first display module, the first input satisfying a condition for moving an image displayed on the first display module;
detecting a second input to the second display module; and
moving the image to a second location of the second input to the second display module when the second input is detected after the first input is detected, and after the first input is released while the second input continues to be detected;
detecting a third input to the first display module; and
moving the image to a third location of the third input when the third input is detected while the second input continues to be detected.

12. The non-transitory computer readable storage medium of claim 11, wherein the first display module and the second display module are exposed externally.

13. The non-transitory computer readable storage medium of claim 11, wherein the image indicates a prescribed function.

14. The non-transitory computer readable storage medium of claim 11, the method executed by the computer-executable instructions further comprising:
setting the second input to an invalid input, when the first input to the first display module is detected and does not satisfy the condition for moving the image;
setting the second input to a valid input when the first input satisfies the condition for moving the image; and
moving the image to the second location when the second input is detected and when the second input comprises the valid input.

* * * * *